Oct. 25, 1966   F. WINKLER ET AL   3,281,091
FILM GUIDING STRUCTURE FOR A MOTION PICTURE CAMERA
Filed May 23, 1963
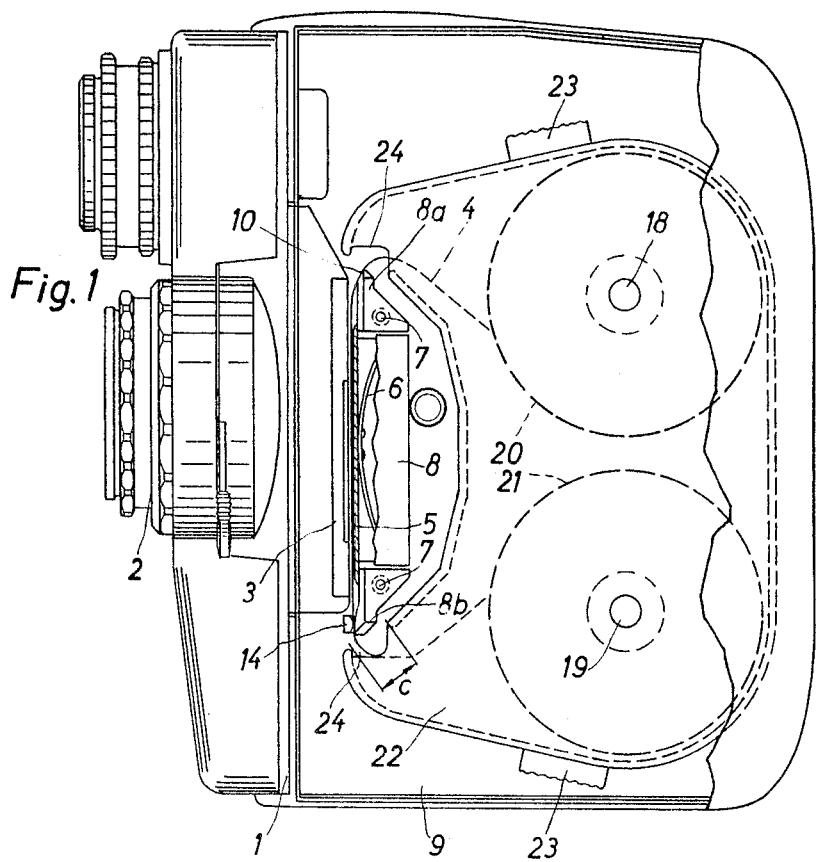
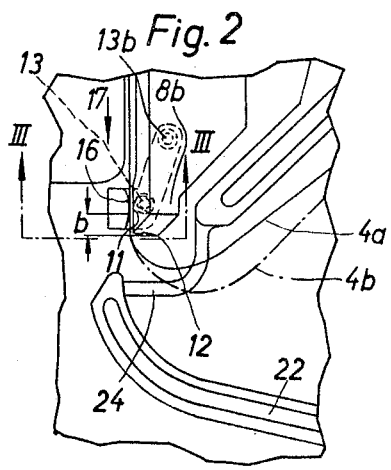
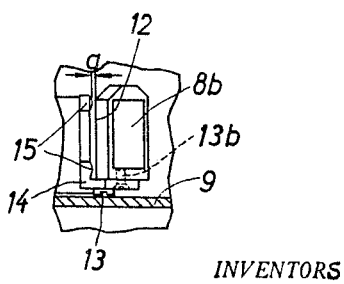
INVENTORS
FRIEDRICH WINKLER
KURT THATE
PAUL FENEBERG
VOLKMAR STENZENBERGER United States Patent Office 3,281,091
Patented Oct. 25, 1966

3,281,091
FILM GUIDING STRUCTURE FOR A MOTION PICTURE CAMERA
Friedrich Winkler, Kurt Thate, Paul Feneberg, and Volkmar Stenzenberger, Munich, Germany, assignors to Agfa Aktiengesellschaft, Leverkusen, Germany
Filed May 28, 1963, Ser. No. 283,829
Claims priority, application Germany, June 6, 1962, A 40,375
11 Claims. (Cl. 242—71.2)

The present invention relates to film guiding structures, particularly film guiding structures adapted for use in motion picture cameras.

In general there are two basic types of structures for guiding film for movement in motion picture cameras, and both of these basic types of structures have inherent disadvantages. Thus, there is the type of camera which does not have a magazine but instead provides simple shafts on which supply and take-up spools are respectively mounted. This type of camera requires the operator to manually mount a spool of unexposed film on one of the shafts and then the film has to be manually threaded through the camera and joined by the operator to the take-up spool. With this type of film guiding structure there is very little safety against exposure of the film, and of course a relatively large leader portion of the film is indeed exposed, and all that can be relied upon is that the outer winding of the film will together with the sides or flanges of the film spool provide light-tightness for the inner film windings surrounded by the outer film winding. Moreover, with this type of construction there is no clearly defined path for the film and the operator must manually bend the film during threading thereof in the camera in order to enable the film to be properly set in the camera.

Of course, it is also known to provide a second type of construction wherein the film is located in a magazine. Such a magazine may house in its interior a pair of film spools, and it is a much simpler matter with such a construction to place the film in the camera since all the operator need do is insert the magazine into the camera and where the film extends substantially along a straight path between the openings of the magazine through which the film passes between the interior and exterior of the magazine it is quite simple to place the film between the film gate and the pressure plate, so that with such a construction the disadvantage inherent in manual threading of the film is avoided and at the same time the extent of light-tightness is greatly increased as compared to spool-loaded cameras. With such magazines special light-sealing structure is located at the openings of the magazine through which the film respectively moves out of and back into the magazine. Moreover, the film is required to be guided not only by structure carried by the camera but also by film guiding structure carried by the magazine itself. It is clear, therefore, that the frictional resistance to movement of the film with a magazine-loaded motion picture camera is far greater than the frictional resistance to movement of the film with a spool-loaded motion picture camera. Where a camera is designed for operation either with or without a magazine, it becomes necessary to provide such a camera with a driving structure which is powerful enough to take care of the greater friction encountered when using a magazine. Not only is the friction increased with a magazine as a result of the additional film guiding structure carried by the magazine itself but also as a result of the frictional contact between the film and the light-sealing structure at the openings of the magazine. If the camera is not provided with a drive which is substantially more powerful than that required for a spool-loaded camera, then when such a drive is used to move film out of and back into a magazine, the camera, if it has a spring drive, will only be capable of advancing a film strip whose length is shorter than would be possible for a spool-loaded camera using the same spring drive, and in any event the relatively large and not at all constant frictional resistance to movement of the film results in a jerky, non-uniform film advance as a result of the reaction of the drive to the large resistances which it encounters, with the result that the film frames are not accurately positioned on the film strip and the best possible exposures are not made.

It is a primary object of the present invention to avoid the above drawbacks by providing a magazine-loaded camera with a structure which has far less frictional resistance to movement of the film than conventional magazine-loaded cameras so that all of the advantages of convenience in introducing the film into the camera with the magazine-type of loading are retained while at the same time the disadvantages resulting from the frictional resistance of this type of construction are avoided, and furthermore the light-tightness is still of a fairly high quality.

A further object of the present invention is to provide a structure of the above type with a magazine which is of an exeedingly simple and inexpensive construction, as compared to conventional magazines.

A further object of the present invention is to provide a camera of the above type which does not produce any undesirably large resistance to movement of the film-advancing claw although the structure of the invention is capable of handling the film in such a way that it will be uniformly wound onto the take-up spool without any loose convolutions.

Yet another object of the present invention is to provide a structure of the above type which is capable of being easily adjusted so that it can operate with films of different thickness, for example.

Also, it is an object of the present invention to provide an exceedingly simple film guiding structure which will in no way injure the film itself, particularly at the emulsion side thereof, while at the same time maintaining the advantages set forth above.

With these objects in view the invention includes, in a motion picture camera, a support means and a magazine capable of being carried by the support means and housing in its interior a supply spool and a take-up spool, the housing of the magazine being formed with a pair of openings through which the film respectively moves out of and back into the magazine from the supply spool to the take-up spool. These openings are quite large, each having a width on the order of several millimeters and there is no light-sealing structure in these openings and furthermore the magazine itself has no film-guiding structure. A film-guiding means is indeed carried by the support means of the camera to guide the film for movement between the openings of the magazine, and it is this film guide means which is carried by the camera itself that forms the only structure for guiding the film, the openings of the magazine being large enough so that at no time does the film engage any part of the magazine in a manner which can influence the nature of the movement of the film from the supply spool to the take-up spool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly schematic side elevation of a motion picture camera provided with the structure of the invention, an outer side wall of the camera being broken away to illustarte the structure behind this side wall, which may be a removable door of the camera, and in addition in FIG. 1 the film-guiding structure is shown in section;

FIG. 2 shows on an enlarged scale, as compared to FIG. 1, that part of the structure which guides the film for movement back into the magazine, as well as the portion of the magazine which receives the film when it moves back into the magazine; and FIG. 3 is a sectional view taken along line III—III of FIG. 2 in the direction of the arrows.

Referring now to the drawings, the housing 1 of the motion picture camera illustrated in FIG. 1 carries a conventional objective 2 as well as a conventional film gate 3 along which the film 4 moves, as is well-known in the art, and the film 4 is urged into engagement with the film gate 3 by a pressure plate 5 urged by a leaf spring 6 toward the film gate, and the ends of the leaf spring 6 press against a stationary member 8 which is removably fixed by screws 7 to a support means in the form of an intermediate wall 9 of the camera. The film-guiding means is formed by the upper portion 8a and the lower portion 8b of the member 8, this film-guiding structure also including an angle member 14 described below. The portion 8a of the film-guiding means has a rounded surface 10 along which the film slides when pulled downwardly by the unillustrated and conventional claw. On the other hand, the lower portion 8b of the film guide means has a front face which is located substantially in the same plane as the pressure plate 5 and which terminates at its lower end in a sharp, 90° corner providing a sharp edge 12 which engages the rear face of the film, this sharp edge being shown most clearly in FIG. 2 as well as FIG. 3. A pair of screws 13 and 13b serve to removably and adjustably fix to the portion 8b of the film guide means a film holding member 14 which also forms part of the film guiding structure, the screw 13b serving as a pivot for member 14 and the screw 13 extending through a slot of the member 14, and the film holding member 14 has a pair of convexly curved, rounded projections 15 (FIG. 3) which are spaced from the surface 11 by the distance as indicated in FIG. 3, this distance being approximately twice as great as the thickness of the film. In accordance with one feature of the invention the distance as indicated in FIG. 3 may range from 1.5 to 3 times the thickness of the film. Each projection 15 has an elongated curved configuration 16 indicated in FIG. 2, this arcuate configuration of each projection 15 extending substantially along a circle whose axis is perpendicular to and spaced forwardly of the film or, in other words, the surface 11. The curved surfaces 16 of the projection 15 engage and guide the film and at their nearest part to the surface 11 are spaced therefrom by a distance $b$ of approximately 2 mm. It will be noted that the curvature of the film-engaging surfaces 16 of the projections 15 is substantially tangent to the direction of movement 17 of the film indicated in FIG. 2. In order to improve the nature of the engagement between the film and the surface 11 this surface may have a pair of elongated ribs which respectively engage the film at opposite side edge portions thereof at its rear face.

The film 4 is completely free to move directly from the supply spool 20, which is carried by the shaft 18, to the upper portion 8a of the film guide means and from the lower portion 8b of the film guide means to the take-up spool 21 which is carried by the shaft 19. In other words there is no part of the structure of the magazine which can in any way influence the nature of the movement of the film between the spools in the magazine and the film-guide means which is carried by the wall 9 of the camera. Thus, if desired, the film spools 20 and 21 themselves may be directly placed on the shafts 18 and 19, respectively, without requiring any additional structure for the guiding of the film, and the manner in which the film is guided does not change if a magazine 22 is used, this magazine 22 being constructed in a known way of a pair of magazine sections which are held together by known locking elements 23. The magazine 22 is formed with openings 24 through which the film passes out of and back into the magazine, and the clearance $c$ provided for the film by the openings 24 is so great that the film is completely free from having the nature of its behavior influenced by any structure of the magazine itself. The clearance or width $c$ of each opening 24 may be on the order of 7 mm. Moreover, the film guide means 8a, 8b is located so close to the openings 24 of the magazine that the film is free to move between the spools, irrespective of the diameter of the film wound thereon, and the film guide means 8a, 8b without engaging any fixed portions of the magazine, and this is true irrespective of the position of the film-advancing claw. The magazine is capable of being placed in the camera first in one position and then in a second position which is inverted with respect to the first position so that it is possible to expose on a film which has a width of 16 mm. first one row of 8 mm. frames along one side of the film and then when the magazine is inverted a second row of 8 mm. frames on the other side of the film.

Of course, in order to guarantee no engagement between the film and magazine which will influence the nature of the film movement it is important that the film loop in the region of the guide portion 8b be free to "breath" when the film wound onto the take-up spool has its largest diameter. FIG. 2 illustrates the two positions of the film during the "breathing" thereof, the solid line position 4a indicating the position of the film just before the film is advanced by the claw and the dot-dash line position 4b indicating the position of the film during advance thereof by the claw. The film is wound onto the take-up spool from the loop portion 4b during advance of the film by the film claw, this winding of the film being brought about as a result of the continuous drive which is transmitted to the take-up spool, so that the film quickly moves from the position 4b to the position 4a where the rear face of the film presses against the relatively sharp edge 12 and is held by the holder 14, the holder 14 cooperating with the edge 12 to provide for the film when it reaches the position 4a a bend which is sharp enough so that the film itself serves to hold the take-up spool 21 against rotation, the drive to the take-up spool slipping at this time through a suitable slip clutch, as is well known in the art. Thus, the relatively small clearance between the projections 15 and the surface 11 together with the sharp edge 12 provide an action similar to that of a clamp on the film when it reaches the position 4a and automatically prevents further turning of the take-up spool. However, as soon as the unillustrated claw starts to advance the film in the direction of the arrow 17 of FIG. 2, the film is immediately released at the portion thereof between the surface 11 and the projection 15 of the holder 14, so that as a result there is very little frictional resistance to operation of the claw with this construction and an extremely accurate positioning or distribution of the film frames along the film strip results. By adjusting the distance between the film holder 14, which is to say the film-engaging surfaces 16 of the projections 15 thereof, and the surface 11 of the film guide portion 8b, the deformation of the film in the direction of film advance ahead of the edge 12 can be determined. Thus, the distance between the film holder and the surface 11 should on the one hand be as small as possible but on the other hand be large enough so that the film can be advanced between the surfaces 16 and the surface 11 without any appreciable frictional resistance to movement of the film. The sharp edge 12 around which the film moves forms a stationary, unchanging starting point for the film loop which extends from the edge 12 and thus the edge 12 determines the position of the loop in the lower opening 24 shown in FIG. 1.

As is apparent from the drawing, the structure of the invention guarantees that the film does not come into engagement with any part of the magazine which can influence the nature of the movement of the film during exposure thereof. On the other hand, when the magazine is placed into the camera so that the film is not being advanced by the film claw these openings 24 of the magazine will situate the film in such a position that it can without difficulty and without any additional auxiliary devices be slipped between the film gate 3 and the pressure plate 5, and it will be noted that the front edge of the member 8 at the face thereof which is directed toward the exterior or removable door at the side of the camera is bevelled so as to facilitate the introduction of the film between the gate 3 and the pressure plate 5. It is to be noted that the structure of the invention shown in the drawing and described above is also suited, without any additional elements, for rewinding of the film since the edge 12 does not provide any substantial retarding or braking force on the film when it is pulled upwardly, as viewed in FIG. 1. It is therefore possible to use the magazine for exposing a 16 mm. film with two rows of 8 mm. frames without inverting the magazine to provide the second row of film frames, without detracting in any way from the advantages of the invention since all of the guiding structure for the film remains in a fixed position relative to the camera and is not exchanged or adjusted. Thus, the devices of other, known magazines for double-8 film required to switch over from one row of film frames to the other are not required with the structure of the invention.

It will be understood that each of the elements described above, or two or more together, may also find a useful application in other types of film guiding structure differing from the types described above.

While the invention has been illustrated and described as embodied in film guiding structure for motion picture cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptation should and are intended to be comprehended within the meaning and range of equivalence of the following claims.

What is claimed as new and desired to be secured by Letters Patent is:

1. In a motion picture camera, in combination, support means; a film magazine carried by said support means and housing in its interior a supply spool and a take-up spool, said magazine being formed with a pair of openings through which the film respectively passes out of the magazine from said supply spool and back into the magazine to said take-up spool; film guide means; and stationary mounting means arranged on said support outside of said magazine for mounting said film guide means on said support outside of and adjacent to said openings of said magazine, said guide means being located in the region of said openings of said magazine and forming the only structure by which the film is guided for movement, so that the magazine itself has no guide means for the film, said openings of said magazine being large enough to provide for free, unobstructed movement of the film without any engagement between the film and magazine which can influence the manner in which the film moves, said guide means including near the magazine opening through which the film returns to the interior of said magazine a guide portion engaging the rear face of the film and beyond which the film moves through said latter opening back into the magazine.

2. In a motion picture camera, in combination, support means; a film magazine carried by said support means and housing in its interior a supply spool and a take-up spool, said magazine being formed with a pair of openings through which the film respectively passes out of the magazine from said supply spool and back into the magazine to said take-up spool; film guide means; and stationary mounting means arranged on said support outside of said magazine for mounting said film guide means on said support outside of and adjacent to said openings of said magazine, said guide means being located in the region of said openings of said magazine and forming the only structure by which the film is guided for movement, so that the magazine itself has no guide means for the film, said openings of said magazine being large enough to provide for free, unobstructed movement of the film without any engagement between the film and magazine which can influence the manner in which the film moves and said openings of said magazine each having a width of several mm., said guide means including near the magazine opening through which the film returns to the interior of said magazine a guide portion engaging the rear face of the film and beyond which the film moves through said latter opening back into the magazine.

3. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; film guide means; and stationary mounting means arranged on said support outside of said magazine for mounting said film guide means on said support outside of and adjacent to said openings of said magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of said magazine a guide portion engaging the rear face of the film and beyond which the film moves through said latter opening back into the magazine.

4. In a motion picture camera, in combination support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine.

5. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith.

6. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith, said film holder being adjustably connected to the remainder of said film guide means.

7. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith, said film holder being spaced from said sharp edge by a distance which is from 1.5 to 3 times greater than the thickness of the film.

8. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith, said film holder having a pair of projections spaced from the central part of the film which is exposed and engaging side edge portions of the film.

9. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith, said film holder having a pair of projections spaced from the central part of the film which is exposed and engaging side edge portions of the film, said projections each being rounded and having an arcuate configuration extending substantially along part of a circle whose axis is perpendicular to the film and spaced forwardly thereof.

10. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith, said film holder having a pair of projections spaced from the central part of the film which is exposed and engaging side edge portions of the film, said projections each being rounded and having an arcuate configuration extending substantially along part of a circle whose axis is perpendicular to the film and spaced forwardly thereof, and the minimum distance between said projections and the remainder of said film guide means being at least 1 mm.

11. In a motion picture camera, in combination, support means; a magazine carried by said support means and housing a pair of film spools, said magazine being formed with a pair of openings through which the film respectively passes out of the magazine from one of the film spools and back into the magazine to the other of the film spools; and guide means carried by said support means for guiding the film for movement at the exterior of the magazine, said guide means being located directly adjacent to said openings of said magazine and forming the only structure which guides the film for movement between said spools so that the magazine itself has no structure for guiding the film, said openings of said magazine being large enough to prevent any engagement between the film and magazine which can influence the nature of the movement of the film, said guide means including next to the magazine opening through which the film returns to the interior of the magazine a stationary sharp guiding edge for engaging the rear face of the film and beyond which the film moves through said latter opening back into the magazine and said film guide means including a film holder for engaging the front, emulsion side of the film and spaced in front of said sharp edge to hold the film in engagement therewith, said film holder being in the form of an angle member which is removably connected to the remainder of said film guide means.

References Cited by the Examiner

UNITED STATES PATENTS

| | | | |
|---|---|---|---|
| Re. 20,595 | 12/1937 | Bouveng | 242—55.13 |
| 1,871,232 | 8/1932 | Foster | 242—55.13 |
| 1,944,023 | 1/1934 | Ford | 242—71.2 X |
| 2,144,622 | 1/1939 | Frost | 242—71.2 |
| 2,535,334 | 12/1950 | Thevenaz | 242—76 X |

FRANK J. COHEN, *Primary Examiner.*

MERVIN STEIN, *Examiner.*

G. F. MAUTZ, *Assistant Examiner.*